(12) United States Patent
O'Brien et al.

(10) Patent No.: US 6,168,825 B1
(45) Date of Patent: Jan. 2, 2001

(54) PROCESS FOR PRODUCING THIN TRANSPARENT GOLD COATINGS

(76) Inventors: Dudley O'Brien, 6301 W. 78th Pl., Los Angeles, CA (US) 90045; Jerry Vogler, 1616 Barrington Ave. #207, Los Angeles, CA (US) 90025; James M. Landry, 8354 Natalie La., West Hills, CA (US) 91304; Gerald S. Jakubowski, 6976 W. 85th St., Los Angeles, CA (US) 90045

(*) Notice: Under 35 U.S.C. 154(b), the term of this patent shall be extended for 0 days.

(21) Appl. No.: 09/432,510

(22) Filed: Nov. 2, 1999

Related U.S. Application Data
(60) Provisional application No. 60/106,637, filed on Nov. 2, 1998.

(51) Int. Cl.[7] ........................................... B05D 5/06
(52) U.S. Cl. ..................... 427/160; 427/163.1; 427/164; 427/165; 427/368; 427/369; 427/426
(58) Field of Search ..................... 427/421, 426, 427/160, 162, 163.1, 164, 165, 168, 368, 369

(56) References Cited

U.S. PATENT DOCUMENTS

| | | |
|---|---|---|
| 3,484,263 * | 12/1969 | Kushihashi et al. . |
| 3,515,571 | 6/1970 | Levy . |
| 3,640,832 | 2/1972 | Kurz . |
| 3,660,137 | 5/1972 | Furuuchi et al. . |
| 3,671,291 | 6/1972 | Miller et al. . |
| 3,679,291 | 7/1972 | Apfel et al. . |
| 3,682,528 | 8/1972 | Apfel et al. . |
| 3,781,077 | 12/1973 | Groth . |
| 3,793,054 | 2/1974 | Franz . |
| 3,885,855 | 5/1975 | Gross . |
| 3,901,997 | 8/1975 | Groth . |
| 3,935,351 | 1/1976 | Franz . |
| 3,978,272 | 8/1976 | Donley . |
| 3,978,273 | 8/1976 | Groth . |
| 4,005,229 | 1/1977 | Miller et al. . |
| 4,010,304 | 3/1977 | Cohen . |
| 4,017,661 | 4/1977 | Gillery . |
| 4,091,128 | 5/1978 | Franz et al. . |
| 4,091,172 | 5/1978 | Miller . |
| 4,125,649 | 11/1978 | Donovan et al. . |
| 4,166,876 | 9/1979 | Chiba et al. . |
| 4,170,688 | 10/1979 | Roentgen et al. . |
| 4,180,954 | 1/1980 | Gell, Jr. . |
| 4,210,705 | 7/1980 | Inskip . |
| 4,226,910 | 10/1980 | Dahlen et al. . |

(List continued on next page.)

FOREIGN PATENT DOCUMENTS 3-187739 * 8/1991 (JP) .

OTHER PUBLICATIONS

Davidoff, Charles "Metalizing Non–Conductors" Metal Finishing; vol. 90, No. 1A (1992) Hackensack, N.J. pp. 314–320.

(List continued on next page.)

*Primary Examiner*—Erma Cameron
(74) *Attorney, Agent, or Firm*—Bruce A. Jagger

(57) ABSTRACT

A process for forming a thin blue colored gold deposit, which transmits substantially more visible light than infrared energy. A suitable substrate, usually transparent, is selected and aggressively cleaned to such an extent that water will sheet rather than bead on the surface. The surface is sensitized with a solid phase sensitizing agent such as tin chloride. The surface is either rubbed with a slurry of the solid phase sensitizing agent or it is or it is dipped into an agitated slurry of the agent. Two very dilute reagent solutions are prepared; a reducing solution, and a gold ion containing solution. The reagent solutions are co-mingled and simultaneously projected onto the cleaned surface. The reagent solutions react to form a blue colored gold deposit on the surface. This blue colored deposit passes more visible than infrared energy by a factor of approximately two.

11 Claims, 2 Drawing Sheets

Percent Transmittance Spectrum of a Gold Coating on Automotive Windshield Glass

U.S. PATENT DOCUMENTS

| Number | Date | Inventor |
|---|---|---|
| 4,294,881 | 10/1981 | Meyer et al. . |
| 4,337,990 | 7/1982 | Fan et al. . |
| 4,368,945 | 1/1983 | Fujimori et al. . |
| 4,382,995 | 5/1983 | Lin . |
| 4,413,877 | 11/1983 | Suzuki . |
| 4,414,254 | 11/1983 | Iwata et al. . |
| 4,465,736 | 8/1984 | Nishihara . |
| 4,497,700 | 2/1985 | Groth et al. . |
| 4,548,691 | 10/1985 | Dietrich et al. . |
| 4,556,277 | 12/1985 | Fan et al. . |
| 4,610,771 | 9/1986 | Gillery . |
| 4,710,426 | 12/1987 | Stephens . |
| 4,773,717 | 9/1988 | Pai et al. . |
| 4,786,783 | 11/1988 | Woodard . |
| 4,790,922 | 12/1988 | Huffer . |
| 4,799,745 | 1/1989 | Meyer et al. . |
| 4,855,186 | 8/1989 | Grolig et al. . |
| 4,898,789 | 2/1990 | Finley . |
| 4,902,081 | 2/1990 | Huffer . |
| 4,902,580 | 2/1990 | Gillery . |
| 4,960,645 | 10/1990 | Lingle . |
| 5,013,779 | 5/1991 | Fariss et al. . |
| 5,061,568 | 10/1991 | Kessel et al. . |
| 5,085,926 | 2/1992 | Iida et al. . |
| 5,189,551 | 2/1993 | Woodard . |
| 5,229,881 | 7/1993 | Day et al. . |
| 5,427,861 | 6/1995 | D'Errico . |
| 5,792,560 | 8/1998 | Friedman et al. . |
| 5,798,146 | 8/1998 | Murokh et al. . |
| 5,864,425 | 1/1999 | Filas . |
| 5,886,075 | 3/1999 | Keane et al. . |

OTHER PUBLICATIONS

Weisberg, Alfred M. "Gold Plating" Metal finishing vol. 90, No. 1A (1992) Hackensack, N.J. pp. 204–218.

Kang, So Young; Jeon, Il Cheol; Kim, Kwan; "Infrared Absorption Enhancement at Silver Colloidal Particles" Applied Spectroscopy, vol. 52, No. 2 (1998) pp. 278–283.

"Thickness of Metallic and Inorganic Coatings" ASTM designation B659–85; (1986) New York, MY pp. 562–565.

Fraser, David B. "Suptnered Films for Display Devices" Proceedings of the IEEE vol. 61, No. 7 (1973) Murray Hill, N.J. pp. 1013–1018.

Williams, V.A. "High Conductivity Transparent Contacts to ZnS" Journal of the Electrochemical Society. vol. 113; No. 3 (1966) pp. 234–237.

Fraser, D.B.; Cook, H.D. "Highly Conductive Transparent Films of Sputtered In2–xSnxO3–y" Solid State Science and Technology vol. 119 No. 10; (1972) pp. 1368–1374.

Fan, John C.C. And Bachner, Frank J. "Properties of Sn–Doped In2O3 Films Prepared by RF Sputtering" vol. 122 No. 12; (1975) pp. 1719–1724.

Kozuka, Hiromitsu and Sakka, Sumio "Preparation of Gold Colloid–Dispersed Silica Coating Films by the Sol–Gel Method" —Chem. Mater, vol. 5, No. 2, (1993) pp. 222–228.

Zhang, S, et al., "Electroless Plating Process" Metal Finishing (1996) p. 120.

Takakuwa, Makoto; Baba, Kazutaka and Miyagi, Mitsunobu "Ultrathin polarizing films for the near–infrared region consisting of stacked antisotropic gold island films" Optical Society of America vol. 21, No. 15 (1996) pp. 1195–1197.

Azarraga, L.V. "Gold Coating of Glass Tubes for Gas Chromatography/Fourier Transform Infrared Spectroscopy "Light–Pipe" Gas Cells" Applied Spectroscopy vol. 34, No. 2 (1980) pp. 224–225.

Reich, S. and Cohen, Y. "Phase Separation of Polymer Blends in Thin Films" Journal of Polymer Science: Polymer Physics Edition, vol. 19 (1981) pp. 1255–1267.

Xia, Younan; Kim, Enoch and Whitesides, George M. "Micromolding of Polymers in Capillaries: Applications in Microfabrication" Chem.Mater vol. 8 (1996) pp. 1558–1567.

Ohtaki, Michitaka; Oshima, Yoshide; Eguchi, Koichi and Arai, Hiromichi "Room Temperature Preparation and Optical Properties of Titania and Silica Thin Films Embodying Polymer–Protected Ultrafine Metal Particles at High Concentrations" Chemical Society of Japan (1992) pp. 2201–2204.

Baker, Bonnie E., Kline, Nicole J., Treado, Patrick J., and Natan, Michael J. "Solution–Based Assembly of Metal Surfaces by Combinatorial Methods" American Chemical Society vol. 118 (1996) pp. 8721–8722.

Blacher, S; Brouers, F; Gadenne, P and Lafait, J. "Morphological analysis of discontinuous thin films on various substrates" American Institute of Physics vol. 74 No. 1 (1993) pp. 207–213.

Hwang, Jeeseong and Dubson, M.A. "Atomically flat gold films grown on hot glass" American Institue of Physics vol. 72 No. 5 (1992) pp. 1852–1857.

(CLD). Gold coatings on Glass, metals, Silicon, and organic Polymers employing organic and fluororganic solvents Eur. J. Solid State Inorg. Chem (1992) pp. 227–260.

* cited by examiner

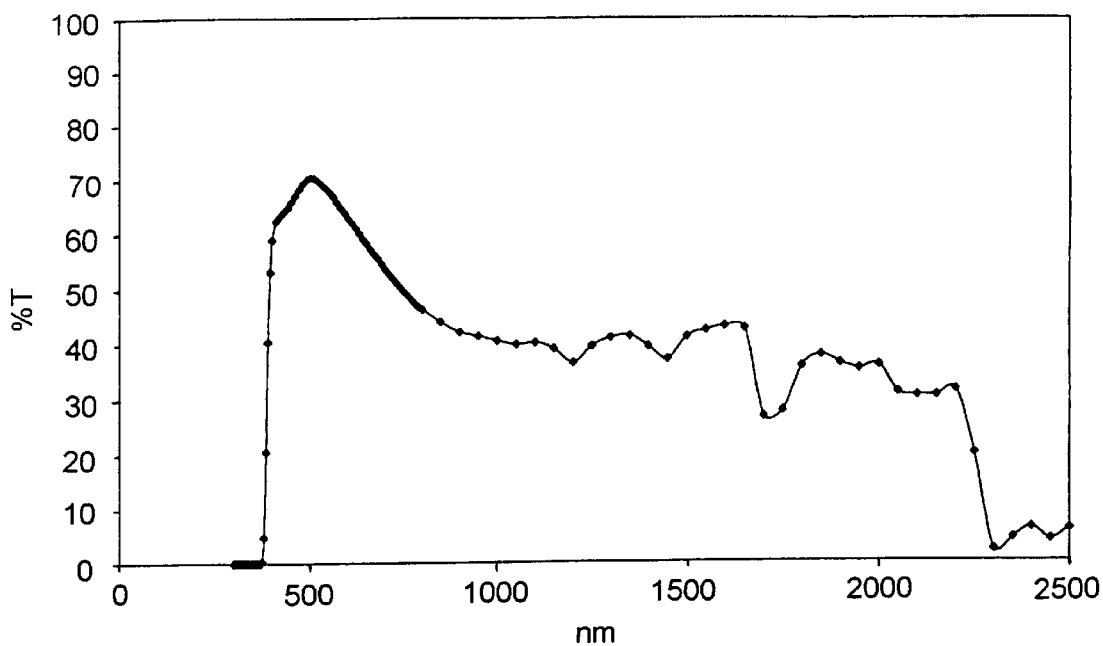
Figure 1: Percent Transmittance Spectrum of a Gold Coating on Automotive Windshield Glass
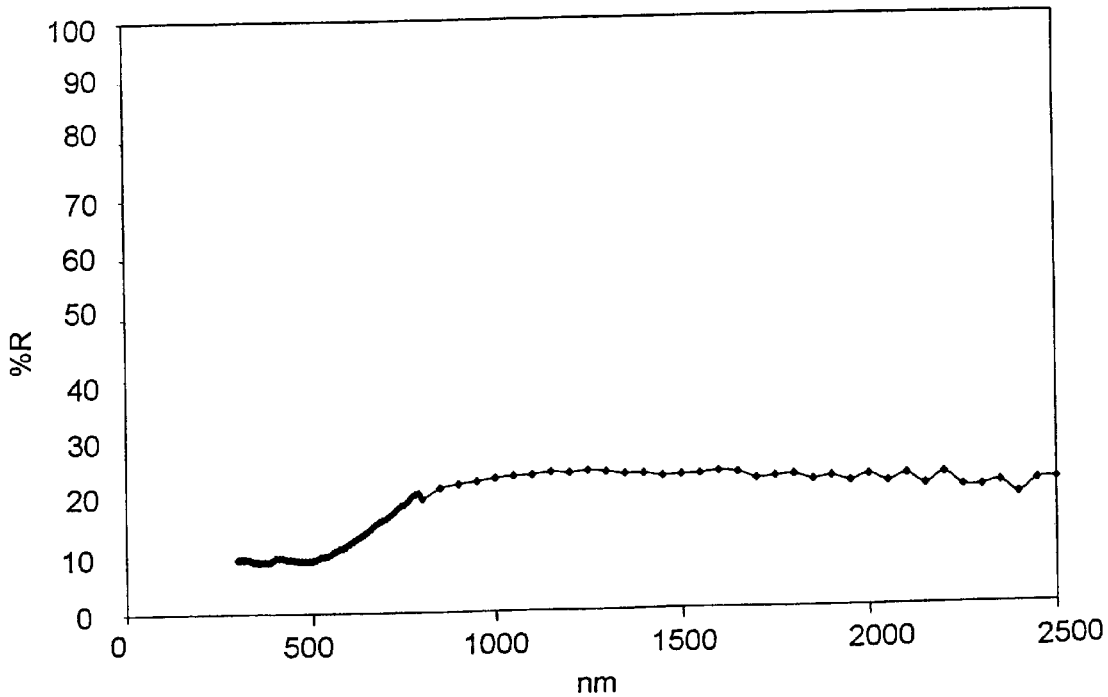
Figure 2: Percent Reflectance Spectrum of a Gold Coating on Automotive Windshield Glass

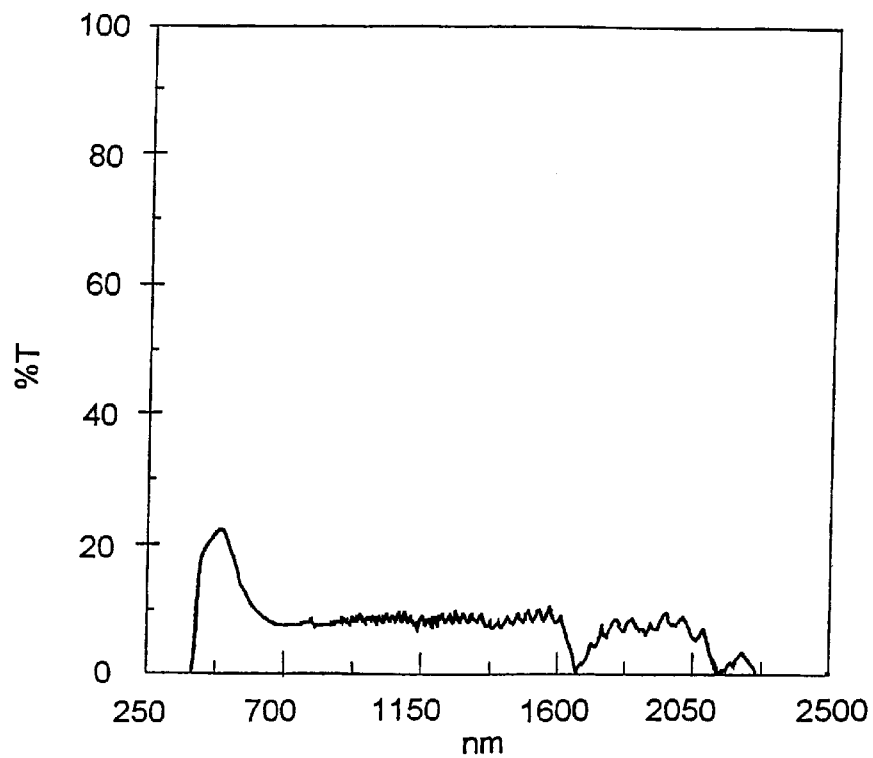
Figure 3: Percent Transmittance Spectrum of a Gold Coating on Polycarbonate
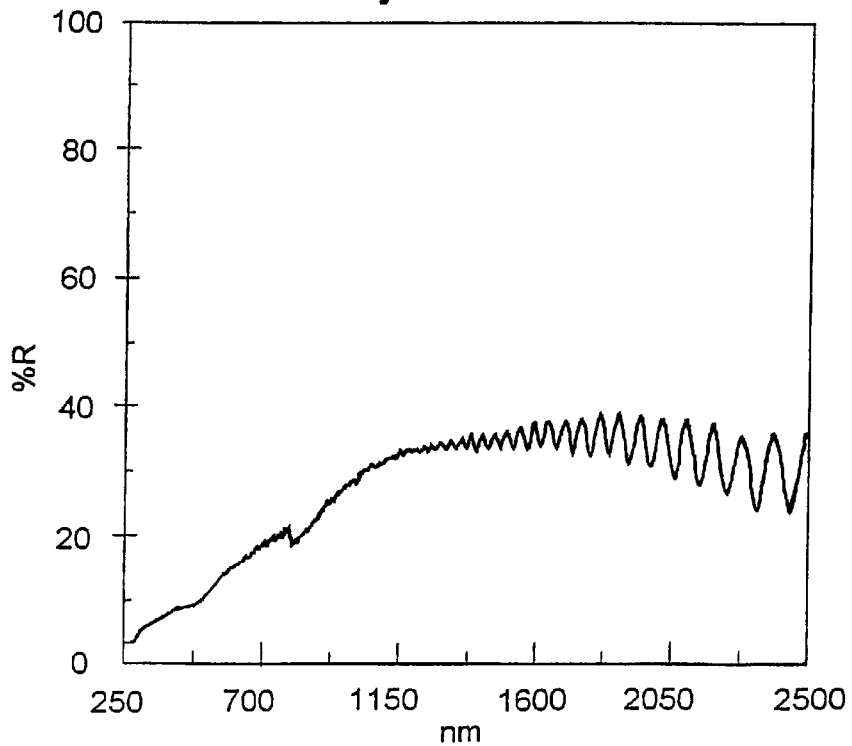
Figure 4: Percent Reflectance Spectrum of a Gold Coating on Polycarbonate

PROCESS FOR PRODUCING THIN TRANSPARENT GOLD COATINGS

Priority is claimed to Prov. Serial No. 60/106,637, filed Nov. 2, 1998.

BACKGROUND OF THE INVENTION

1. Field of the Invention

The invention relates in general to the production of uniform, tightly adhered, thin, transparent gold coatings, and, in particular, to the efficient and economical production of such films on surfaces. More particularly, this invention relates to the production of thin transparent blue to blue-green gold coatings on nonmetallic surfaces using an electroless spraying process for deposition resulting in films which transmit a high degree of visible light, while still blocking a large amount of infrared light.

2. Description of the Prior Art

Gold coatings can be deposited onto substrate materials through the use of electroless chemical deposition processes. A good review of the prior art before 1960 is given in a two part article by Samuel Wein ("Gold Films," The Glass Industry, May 1959 p. 280 and June 1959, p. 330). Here a variety of formulations are presented as well as techniques involving both dipping and spraying methods of application. The methods described are relatively slow requiring five minutes to twenty four hours for reaction to occur, and many require the procedure to be carried out at elevated temperatures.

Levy was awarded U.S. Pat. No. 3,515,571, which describes the simultaneous spraying of two solutions onto substrates. The gold solution is made of a gold salt (gold chloride, gold bromide, or sodium gold thiosulfate) neutralized with sodium hydroxide or other metal hydroxides to which is added a ligand solution of diethylenetriamine neutralized with acid (hydroboric acid). The reducing solution contains hydrazine and an alkali metal hydroxide. The two solutions are simultaneously sprayed onto a sensitized (using a solution of stannous chloride) substrate with a dualhead spray set-up. The technique was used to provide gold mirror films for use in heat shielding in various NASA spacecraft applications. The thickness of the films described both in the patent as well as other related literature (Levy, The Lockspray-Gold Process Technical Data Bulletin, Lockheed Palo Alto Research Laboratory, April 1966) ranged from 0.4–80 micro-inches (100–20,300 Angstroms) in thickness. The literature reports that it is difficult to control the deposition of thin films (less than 200 Angstroms) without modification to the procedure. In addition, no mention of chemical deposition onto polycarbonate as a substrate was described.

In U.S. Pat. No. 3,484,263, Kushashi et al. form semi-transparent gold coatings on glass by using an alkaline solution containing a gold salt, a reducing agent, and an alkali carbonate to contact the glass. The system is maintained at less than 10 degrees centigrade for 0.5–5 minutes, then irradiated with a mercury lamp of 2500–5000 nanometers wavelengths to cause reduction. This is reported to give good uniformity for the resulting film, but requires temperature control, and a light source to initiate reduction.

Miller and Cavitt in U.S. Pat. No. 4,005.229 describe the rapid deposition of gold films at ambient temperature using a delivery system similar to Levy. The glass is prepared as described by Miller et al. in U.S. Pat. No. 3,723,158, sensitized with stannous chloride, and activated with a dilute solution of palladium chloride or a thin catalytic metal film, typically silver, through a spray reduction process. The gold solution employed consists of gold chloride, sodium carbonate, and a surfactant. The solution is then aged. The reducing agent is hydrazine tartrate with a source of divalent ion added, preferably lead nitrate. Miller in U.S. Pat. No. 4,091,128 describes a method involving cleaning of the glass substrate as described by Miller et al. in U.S. Pat. No. 3,723,158, followed by sensitizing with a stannous chloride solution, then an activation step using either silver ions or palladium chloride in solution. A gold chloride with sodium carbonate solution is reduced by hydrazine reducing agents with a small amount of surfactant added to the solution using a double nozzled spray gun. The resulting coating is then rinsed and a film of silver is added through a similar spray process involving a silver solution contacted by a reducing solution. It is reported that the resulting film has a more intense gold color and superior durability compared to simply a deposited gold film. Both patents describe techniques for rapid deposition, but require an activation step before film deposition. The patents report films produced with luminous transmittance percent values up to 45 percent. In addition, glass is the only substrate described in either patent.

Very thin deposits of gold, for example, deposits with thicknesses of less than approximately 300, and preferably, 200 Angstroms, are more or less transparent to visible light. The nature of the deposit determines to a significant degree how much visible light is transmitted. Some gold deposits appear pink to golden as soon as they become visible to either incident or transmitted light, and others appear blue to blue-green or blue-gray until they reach a thickness of several hundred Angstroms. Of the various forms of gold, the blue to blue-green to blue-gray deposits are the most transparent to visible light. For ease of reference, as used herein, unless otherwise indicated, it will be understood that the use of "blue" describes and includes all shades of blue, including the blue-green to blue-gray deposits. Such blue deposits generally transmit approximately half as much infrared energy as they do visible light. The pink colored gold deposits generally transmit more infrared than visible energy. The blue deposits are thus much preferred over the pink colored gold deposits for use in applications where visible light is to be transmitted and infrared energy is to be blocked. The inexpensive production of satisfactory blue deposits under desirable production conditions and restraints had generally been impossible or impractical. Uniformity and tight adherence of the deposits to the substrate, ease of production and repeatability had generally been unsatisfactory.

The physical properties of thin transparent gold films include the transmittance of significant amounts of visible light while blocking much of the infrared light from passing through the substrate. This is accomplished through a highly reflective process. For use as windshields in automobiles, the law requires the glass to have at least 70 percent transmittance of visible light. At least 20 percent, and, prefereably as much as 40 percent of the infrared energy should be blocked. This was reported to be a problem in the Levy's Lockspray process, and was not achievable in the Miller patents. In order to achieve a 50 percent or greater transmittance, it is necessary for the gold film to be less than approximately 200 angstroms in thickness. Achieving a uniform, tightly adhered coating at thicknesses of approximately 200 angstroms or less inexpensively, rapidly and simply had generally been considered to be impractical.

Sputtering has been proposed as a preferred way of producing thin gold coatings. Sputtering operations require that they be performed in very closely controlled environments. They can not be performed in ambient conditions, which limits their use to fixed location manufacturing sites with significant capital investment in equipment. They can not, for example, be used to coat a window at the location of a construction project or in a manufacturing station that is open to the ambient environment.

Those concerned with these problems recognize the need for improvement.

BRIEF SUMMARY OF THE INVENTION

A preferred embodiment of the process of gold deposition according to the present invention comprises selecting a substrate and cleaning the surface upon which the thin film of gold is to be deposited. Preferably, as a part of the cleaning, the surface is lightly etched so that a fresh debris free surface is presented. The etching can be accomplished chemically, for example, with an etching solution, or mechanically, for example, with a polishing compound, or both. The etching is so light that it does not significantly change the optical characteristics of the panel that is to be coated, but it is apparently sufficient to provide sites where a sensitizing agent can attach to the surface. Preferably, the cleaning is sufficiently aggressive so that demineralized water will form a sheet rather than bead on the cleaned surface. At least the apparent surface tension of the surface is reduced. Surfactants can be used if desired to aid in reducing the apparent surface tension of the cleaned surface.

Preferably, a solid phase sensitizing material is applied to the cleaned surface utilizing a tribolic application procedure. That is, some friction is involved which apparently results in smearing the sensitizing material on the surface of the substrate. Alternatively, the surface can be treated with a slurry of the sensitizing material without the application of friction. Better uniformity and adhesion are generally achieved if the sensitizing material is applied with friction. The use of a solid phase sensitizing agent, with or without frictional application, enhances the uniformity and adherence of the gold coating. The sensitizing material promotes the formation of an elemental gold deposit on the surface. It has been found that very uniform, tightly adhered blue gold deposits can be formed on dielectric substrates when the sensitizing agent is applied using a tribolic procedure.

A liquid phase gold reducing reagent is prepared. A liquid phase gold ion-containing reagent is also prepared. For a successful spray operation, these two reagents must be applied simultaneously to the cleaned and sensitized surface, but they can not be mixed for more than a fraction of a second or so before they contact the surface. The reaction between the reducing agent and the gold ion-containing reagent proceeds very rapidly. Uniformity of the thin gold coatings is improved by using dilute reagents. The dilution is believed to reduce the rate of reaction. For coating to occur the reaction must take place on the surface that is to be coated. One convenient method of spray application comprises co-spraying the two reagents onto the surface from different spray heads, with the two separate spray patterns being overlapped just above the surface. Using this procedure, with low concentrations, most of the reduction of the gold ions to elemental gold occurs on the surface, rather than above it.

While not wishing to be bound to any theory, it is believed that the tribadically applied solid phase sensitizing agent adheres tightly to closely spaced sites on the surface of the dielectric. At least initially, these nucleation sites are where the gold deposits form. As the gold deposits grow it is believed that they expand epitaxially from these sites. It seems unlikely that the gold deposits at these various sites are fully connected throughout the surface at the coating thicknesses that are capable of transmitting visible light. The gold deposits are most likely in the form of islands of gold crystals spaced slightly from one another on the dielectric surface, as can be seen with a scanning electron microscope. The gold crystal islands are believed to be irregular in size and shape. Therefore, the recital of thickness is a measure of light transmittance and not a measure of the thickness of a continuous layer of gold. For purposes of this application, the recital of a thickness of approximately 300 Angstroms is an indication that the deposit of gold is substantially opaque (less than 10 percent transmittance) to energy in the visible spectrum. A recital of a thickness of approximately 200 Angstroms indicates that the deposit of gold transmits at least about 50 percent of the energy in the visible spectrum. The preferred thin gold deposits according to the present invention transmit from at least approximately 10 to 70 percent or more of the incident visible light. In general, the preferred deposits transmit approximately half as much of the incident infrared energy as they do of the incident visible light. Such deposits are generally some shade of blue, and not pink or gold.

The tribolic application of the sensitizing agent is conveniently accomplished by, for example, rubbing a slurry of the solid phase sensitizing agent on the cleaned surface of the dielectric. The solid particles of the sensitizing agent are well lubricated by the liquid phase of the slurry so there is generally no apparent scratching of the surface by the sensitizing agent. Where the surface of the substrate is soft and there is a risk of scratching it, the sensitizing agent is applied with out friction, for example, by dipping it in a slurry of sensitizing agent. A soft felt pad, for example, is dipped into the slurry and rubbed on the clean dielectric surface for the tribolic application. Although not wishing to be bound by any theory, it appears that the solid sensitizing agent is smeared across the clean surface of the dielectric where traces of it are retained at various closely spaced, generally uniformly distributed sites. Alternative methods of tribolic application include, for example, forcefully projecting a highly pressurized jet of the slurry against the dielectric surface. The frictional engagement between a solid phase sensitizing agent and a clean dielectric surface promotes both tight adhesion and uniformity of the subsequent gold deposit.

Stannous compounds have been widely used as sensitizing agents, but not in slurry form, and not with tribolic application procedures. Various sensitizing agents can be applied utilizing tribolic procedures. Such sensitizing agents include, for example, tin, indium, palladium, germanium, aluminum, lead, manganese, titanium, and gallium compounds, mixtures thereof, and the like, in slurry form. Stannous compounds are generally preferred. Typically, these sensitizing agents are in the form of chloride, fluoride or other salts, for example, $PdCl_2$, $PbCl_2$, $Pb(C_2H_3O_2)_2$, $GeCl_2$, $InCl_3$, $AlCl_3$, $GaCl_3$, $TiCl$, $SnCl_2$, and the corresponding fluorides.

Suitable substrates for use according to the present invention comprise those objects that have solid or semi-solid surfaces, that are substantially transparent or at least translucent to energy in the visible region of the electromagnetic spectrum, and that are mechanically and environmentally stable. Suitable dielectric substrates include, for example, window glass, auto glass, and various plastics such as, for example, polycarbonate, polyvinylbutyral, vinyl, polyester, and the like. The ability of very thin gold coatings to block infrared energy while transmitting visible energy is particularly useful where visibility or at least the ability to transmit light through a panel is required. There are some applications where the ability to transmit light is of no concern. The present invention is applicable to the application of an infrared barrier on opaque surfaces where thermal rejection is desired. The blue coatings also have application where they are desired for their decorative effect. Such opaque surfaces include, for example, ceramics, crystalline materials, metals, and the like. The shape of the surface has little or no effect on the process according to the present invention, provided that the tribolic application of a sensitizer can be accomplished.

The surface of the substrate that is to be coated must be cleaned. Almost all surfaces, as made and stored, have some residue or debris on them. This will prevent the adhesion of a thin gold deposit. Fingerprints alone will generally prevent a coating from forming. Generally, a strong industrial detergent should be used to remove all grease. If other contaminates are present, other cleaners should also be used, as needed. In general, full immersion in a detergent bath with agitation will remove most greases and low molecular weight organic materials. Other procedures such as, for example, ultrasonic baths can also be used if desired.

As a part of the cleaning operation the surface can be etched. This serves at least two purposes. Most cleaning agents leave a film or deposit of material on the surface. This must be removed or the gold deposit will not adhere to the surface. This removal must be accomplished without depositing something else on the surface. Also, the surface should be prepared so that it interacts with the tribolically applied solid phase sensitizing agent to form nucleation sites. Where high precision optical characteristics are required, the etching is more in the nature of a pickling operation that removes oxides and the like from the surface. Glass surfaces generally respond well to treatment with, for example cerium or tin oxide. Cerium and tin oxides are generally known to be used as polishing agents for glass, and the like. The exact mechanism by which rubbing the surface with cerium or tin oxide prepares the surface is unknown, but it is effective and is generally included here as an etching process. Metal surfaces are generally etched by being subjected to pickling operations whereby oxides and the like are chemically removed. Mechanical etching steps such as, for example, grit blasting, sanding, scraping, and the like are generally less preferred because they are too aggressive for use with surfaces that are intended to transmit optical quality images. Where the expense is justified, vacuum techniques such as, for example, ionized gases can be used to clean and etch substrates. Whether described as etching or pickling, such procedures are included in the cleaning operation.

While not wishing to be bound to any theory, the tribolic application of the sensitizing agent, or at least the use of a slurry in which the sensitizing agent is present as a solid phase, in combination with the very dilute reactants, unexpectedly contributes substantially to the very uniform and highly adhesive blue colored gold coating.

Other objects, advantages, and novel features of the present invention will become apparent from the following detailed description of the invention when considered in conjunction with the accompanying drawings.

BRIEF DESCRIPTION OF THE DRAWINGS

The present invention provides its benefits across a broad spectrum of gold plating operations. While the description which follows hereinafter is meant to be representative of a number of such applications, it is not exhaustive. As those skilled in the art will recognize, the basic methods and apparatus taught herein can be readily adapted to many uses. It is applicant's intent that this specification and the claims appended hereto be accorded a breadth in keeping with the scope and spirit of the invention being disclosed despite what might appear to be limiting language imposed by the requirements of referring to the specific examples disclosed.

Referring particularly to the drawings for the purposes of illustration only and not limitation:

FIG. 1 shows wavelength versus the percent transmittance spectrum of a blue-green gold coating on automotive windshield glass.

FIG. 2 shows wavelength versus the percent reflectance spectrum of a blue-green gold coating on automotive windshield glass.

FIG. 3 shows wavelength versus the percent transmittance spectrum of a blue-green gold coating on a polycarbonate substrate.

FIG. 4 shows wavelength versus the percent reflectance spectrum of a blue-green gold coating on a polycarbonate substrate.

DETAILED DESCRIPTION OF THE PREFERRED EMBODIMENTS

According to a preferred embodiment, which has been selected for purposes of illustration, a clear, transparent, flat, polycarbonate panel measuring about 6 by 6 by 0.25 inches was selected and all sharp edges and burrs were removed. The process was carried out in the open air at room temperature, that is, between about 18 and 30 degrees ambient temperature. The surface that was to be coated was cleaned in a bath of Micro detergent for about 15 minutes. "Micro" is a registered trademark of PPG Industries, Inc. The bath was prepared by diluting 20 milliliters of Micro detergent concentrate to 1 liter with demineralized water (2 percent by volume, ml/ml). The cleaned panel was spray rinsed with demineralized water to remove all visible traces of detergent. The spray rinsed panel was immediately immersed in a bath of pre-etch treatment solution for a period of about 2 minutes. The pre-etch treatment solution was prepared by mixing 75 milliliters of dichloropropanl (1,3 Dichloro-2-Propanol) to 231.25 milliliters of isopropanol, and then diluting the mixture to 1 liter with demineralized water (23.1 percent by volume, ml/ml). This process solution had a pH of 2.886. The panel was withdrawn from the pre-etch treatment solution and immediately rinsed with demineralized water. The panel was then dried with clean compressed air. The dried panel was immersed in a bath of chromic acid etch solution for a period of about 1 minute. The chromic acid etch solution was prepared by dissolving 27 grams of sodium dichromate ($Na_2Cr_2O_7 \cdot 2H_2O$) in 150 milliliters of demineralized water (0.030 grams/ml). The solution was then added to 750 milliliters of 96.5 weight percent (gm/gm) sulfuric acid. The resulting etching solution had a pH of −0.851. The etched panel was then thoroughly rinsed with demineralized water. The etching was so light that it was not visible to the naked eye. The etched panel was then rinsed with a dilute solution of hydrochloric acid (8.33 milliliters of 37.3 percent hydrochloric acid diluted to 1 liter with demineralized water, pH 1.814, reagent concentration of 0.311 percent by weight, g/g), to remove any residual chromium from the surfaces. This acid wash was followed by a thorough rinse with demineralized water. The etched panel was then immersed in a sensitizing stannous chloride ($SnCl_2 \cdot 2H_2O$) slurry for about 2 minutes. The sensitizing solution was prepared by mixing 10 grams of tin (II) chloride-$2H_2O$ with 40 milliliters of 37.3 percent hydrochloric acid and diluting the mixture to 1 liter with demineralized water (pH 1.496, 1.0 weight percent $SnCl_2$-$2H_2O$, 1.49 weight percent HCl). Because the stannous chloride did not all dissolve, the slurry was agitated throughout the immersion period. The sensitized panel was then rinsed with demineralized water, and while it was still wet from the rinse step the gold coating was applied. The gold coating was applied by simultaneously spraying two solutions onto the surface. The two sprayed solutions were allowed to mix in the air just before impacting the surface. The first solution was a reducing reagent. The second was a gold bearing reagent. The reducing agent was prepared by mixing together equal portions of two precursor solutions a few minutes before the reducing agent was sprayed. The first precursor solution was prepared by mixing 20 milliliters of 3 percent hydrogen peroxide with sufficient demineralized water to make 1 liter (pH 5.691, 0.06 weight percent $H_2O_2$). The second precursor solution was prepared by dissolving 1.2 grams of sodium carbonate in sufficient water to make 1 liter (pH 10.506, 0.12 weight percent $Na_2CO_3$). When these two precursors are mixed together the resulting solution has a pH of about 9.805. The gold bearing solution was composed of 2 grams of sodium tetrachloroaurate ($NaAuCl_4$-$2H_2O$) and 1.5 grams of sodium carbonate diluted to 1 liter with demineralized water (pH 7.269, 0.20 weight percent of $NaAuCl_4$-$2H_2O$, 0.15 weight percent of $Na_2CO_3$). The spray heads were positioned so as to form an angle of approximately 40 degrees so the sprays overlapped. The spray heads were held about 6 to 8 inches from the surface so that there was substantial intermixing of the reagent solutions in mid-flight just before they impacted the surface. The volume of the reducing reagent was approximately twice that of the gold bearing reagent. The combined or co-spray is repeatedly swept rapidly over the entire surface of the panel. The process was continued until each area of the workpiece had received the co-spray for approximately 0.5 to 1 minutes. A coating thickness of about 200 Angstroms was produced. The blue-green coating of metallic gold was found to be very uniform throughout the surface of the panel. The percent transmittance of visible light throughout the surface of the polycarbonate panel varied by less than 3 percent from the nominal value of 70 percent. Only approximately 30 to 35 percent of the infrared energy was transmitted through the coating. Heating this coating at approximately 200 degrees centigrade for about 1 hour generally causes the coating to turn slightly pink. This pink coating transmits more infrared than visible energy. Color is thus a good indicator of the transmittance characteristics of the coating. Coating the blue-green gold coating with a clear acrylic layer before heating it retains the blu-egreen color and its transmittance characteristics. For purposes of protection from the environment, it is very desirable to overcoat the gold deposit with a protective layer.

Repeating this process and applying the co-spray of reducing and gold bearing reagents for about 5 minutes to each area produced a very uniform fully reflective gold colored opaque coating.

Repeating this process where the precursor solutions for the reducing reagent were, respectively, 20 milliliters of 37 percent formaldehyde diluted to 1 liter with demineralized water (pH 3.644, 0.74 weight percent), and 20 grams of sodium carbonate diluted to 1 liter with demineralized water (pH 11.330, 2.0 weight percent), produced substantially the same result.

Repeating this example using a palladium chloride slurry as the sensitizing agent produced a blue-gray gold coating that transmitted approximately twice as much visible as infrared energy.

The reducing and gold ion solutions should be prepared shortly before use. Allowing the solutions to age for a period of 3 or 4 days will reduce the reaction rate at which the gold deposit is formed.

Repeating these examples using glucose solutions as the reducing agent produces acceptable blue coatings.

It has been found that the use of hydrogen peroxide reductant tends to produce deposits that are true blue in color, while the use of formaldehyde produces blue-green colored deposits. The use of palladium chloride as the sensitizer tends to produce blue-gray colored gold deposits.

Repeating these examples at different concentrations and molar ratios shows that the preferred ranges are as follows:

$NaAuCl_4$-$2H_2O$: from about 0.2 to 2.08 weight percent (w/w) (About 0.1 to 1.04 weight percent of gold)

Formaldehyde: from about 1.48 to 0.074 weight percent (w/w)

Glucose: from about 44 to 0.10 weight percent (w/w)

Hydrogen peroxide: from about 2 to 0.06 weight percent (w/w).

For the reductant-gold ion reaction the molar ratios are preferably within the following ranges:

$NaAuCl_4$-$2H_2O$: Formaldehyde About 1:200 to 1:5

$NaAuCl_4$-$2H_2O$: Glucose 1:200 to 1:1

$NaAuCl_4$-$2H_2O$: Hydrogen peroxide 1:200 to 1:3.5.

In the above molar ratios the lower values for the reductants generally indicates the stoichiometric amount that is required to react with all of the gold ion. The larger values indicate the stoichiometric excess than can generally be tolerated. In general there is no substantial advantage to using large excesses of the reductants.

In general, excess reductant is employed. Large stoichiometric excesses by approximately 2 orders of magnitude or more can generally be used, if desired. The amount of gold ion is minimized because of the cost of gold. The process is generally controlled relative to the gold ion. The respective volumes of the reagents that are applied to the substrate are adjusted to provide the desired dilute concentration of gold in the reaction admixture on the substrate and at least sufficient reductant to completely reduce the available gold. In general, the concentration of the gold ion in the gold ion bearing solution should preferably be between approximately 0.1 and 1 weight percent, and generally from approximately 0.05 to 1.5 weight percent of the solution.

The electroless reactions by which gold is plated out on a substrate are believed to involve several different equilibrium reactions that are somewhat pH sensitive. In general, the pH of the reductant solution should be between approximately 8 and 12, preferably between approximately 9 and 11, and that of the gold ion containing solution should be between approximately 6 and 8, preferably approximately 6.5 to 7.5. The gold ion containing solution is generally approximately neutral.

Repeating this process using substrates of polyester, polyvinylbutyral, vinyl, optical plastics, and the like, will produce satisfactory thin gold coatings. Where lenses or other optical elements are being coated, the article being coated can be subjected to procedures that will insure an even coating. For example, a lens can be rotated as the coating is applied. In general, optical elements are not subjected to the tribolic application of the sensitizer. They are generally dipped in a slurry of the sensitzer. Also, the cleaning step generally does not include any etching which would degrade the optical qualities of the article.

Repeating this process using gold (III) chloride as the source of gold produced satisfactory results.

Repeating this process using a glass substrate, which was mechanically etched by buffing it with an aqueous slurry of $CeO_2$, instead of chemically etched, produced substantially the same uniform, 200 Angstrom thick, blue-green gold coating. Buffing with an aqueous slurry of tin oxide also produces an acceptably clean substrate surface.

This process was repeated with satisfactory results when the panel was polyvinylbutyral and the surface was mechanically etched by rubbing it with a slurry of $CeO_2$ on a felt pad, and sensitized by rubbing it with an aqueous paste of tin (II) chloride on a felt pad.

This process was repeated as follows:

Gold reagent solution—(0.1 grams of sodium tetrachloroaurate (III) per 25 milliliter of water, and 0.07 grams of sodium carbonate per 25 milliliters of water);

First reducing precursor—20 milliliter portion of a solution containing 49.3 milliliters of a 3 percent solution of hydrogen peroxide in 100 milliliters of water Second reducing precursor—20 milliliter portion of a solution, containing 4 grams of sodium carbonate in 100 milliliters of water and 0.25 milliliters of the surfactant, Triton-X. Triton-X is a trademark of Union Carbide.

The two 20 milliliter precursor portions were mixed together.

Reducing reagent—an 8.88 gram solution of glucose in 100 milliliters of water was mixed with a 4.0 gram solution of sodium carbonate in 100 milliliters of water, and 0.25 milliliters of the surfactant, Triton-X was added to the resulting mixture. The mixture of the two precursor portions was added to this mixture to produce the reducing reagent. Co-spraying the reducing and gold reagents on a glass surface that had been mechanically etched with $CeO_2$ produced substantially the same uniform 200 Angstrom thick gold coating.

The surfactant can be applied as a separate rinse step after cleaning, with the sensitizing reagent, or at several points in the process, as desired.

The cleaning step can be varied as may be required to properly prepare the surface. If oil, plasticizer, polymer residue or other processing aids or artifacts are present on a particular surface, cleaning procedures and reagents that are appropriate to removing the surface contamination must be employed. The nature of the contaminate and the surface, as will be understood by those skilled in the art, will dictate the required cleaning procedure.

The etching step is frequently necessary to insure that the surface is completely free of contaminates and surface features that might prevent the gold from depositing on and adhering tightly to the surface. Also, the etching, although generally too light to have any significant influence on the optical characteristics of the surface, roughens the surface enough at the microscopic level to promote adhesion between the gold coating and the surface. The specific etching step, as will be understood by those skilled in the art, is dictated by the nature of the surface. For glass, the etching is generally mechanical and involves the use of, for example, a polishing compound. Thermoplastic surfaces generally respond well to chemical etching agents, although mechanical etching can also be used, if desired. Mechanical etching may be too aggressive for some softer plastic surfaces.

The preferred substantially transparent blue colored gold coatings can be formed, according to the present invention, on a variety of surfaces, including, for example, solid and semi-solid surfaces such as glass, transparent or translucent ceramics, organic plastics composed of various polymers, gelatins, and the like. Gelatin filters, for example, are often used in photography, and infrared blocking is occasionally a desired property in such filters.

The thin gold coating is fragile and generally requires an overcoat to protect it from mechanical damage, particularly abrasion. Suitable overcoats comprise, for example, spray or flow applied overcoat finishes such as acrylic, polyurethane, polysiloxane, or the like.

What have been described are preferred embodiments in which modifications and changes may be made without departing from the spirit and scope of the accompanying claims. Obviously many modifications and variations of the present invention are possible in light of the above teachings. It is therefore to be understood that, within the scope of the appended claims, the invention may be practiced otherwise than as specifically described.

What is claimed is:

1. Process of applying a blue coating of gold on a surface of a substrate comprising:
    selecting a substrate having a clean surface, said surface being cleaned sufficiently to permit the adhesion of said blue coating of gold to said surface;
    applying a solid phase sensitizing material to said clean surface;
    forming a liquid mixture of a reducing reagent and a gold ion containing reagent and substantially simultaneously with said forming, applying said liquid mixture to said clean surface; and
    allowing said liquid mixture to react on said clean surface and form a substantially transparent blue colored gold deposit on said clean surface.

2. Process of applying a blue coating of gold on a surface of a substrate according to claim 1 wherein the concentration of said gold ion in said gold ion containing reagent is from approximately 0.1 to 1.0 percent by weight.

3. Process of applying a blue coating of gold on a surface of a substrate according to claim 1 wherein said solid phase sensitizing material is tribolically applied to said surface.

4. Process of applying a blue coating of gold on a surface of a substrate according to claim 1 wherein said reducing reagent is supplied to said liquid mixture in stoichiometric excess.

5. Process of applying a blue coating of gold on a surface of a substrate according to claim 1 wherein said gold ion containing reagent has an approximately neutral pH, and said reducing reagent has a pH of between about 8 and 12.

6. Process of applying a thin blue coating of gold on a surface of a substrate according to claim 1 including selecting a glass substrate.

7. Process of applying a blue coating of gold on a surface of a substrate according to claim 1 including selecting a plastic substrate, and said allowing comprises allowing a substantially transparent blue coating of gold to form on said plastic substrate.

8. Process of applying a blue coating of gold on a surface of a substrate according to claim 1 including selecting a polycarbonate substrate.

9. Process of applying a blue coating of gold on a surface of a substrate according to claim 1 including selecting a substantially solid transparent substrate.

10. Process of forming a blue colored deposit of gold on a substrate, said deposit having a transmittance of at least about 40 percent of the incident visible light and less than about 30 percent of the incident infrared energy, said process comprising:
    selecting a substantially transparent substrate;

cleaning a surface of said substrate to produce a clean surface, said surface being cleaned sufficiently to prevent water from beading on said clean surface;

tribolically applying a solid phase sensitizing agent to said clean surface to produce a sensitized surface;

preparing a reducing solution of a reducing agent;

preparing a gold ion solution containing from about 0.1 to 1.0 weight percent gold ion;

mixing said gold ion solution with a stoichiometric excess of said reducing solution to form a reactant mixture and substantially simultaneously with said mixing, applying said reactant mixture to said clean surface;

allowing said reactant mixture to react whereby a blue colored gold deposit is formed on said clean surface;

discontinuing allowing said reactant mixture to react before said blue colored gold deposit reaches a thickness of about 300 Angstroms.

11. Process of forming a blue colored deposit of gold on a substrate according to claim 1 including applying a solid phase sensitizing material to said clean surface by dipping said clean surface in a slurry of said solid phase sensitizing material.

* * * * *